(12) United States Patent
O'Brien et al.

(10) Patent No.: US 7,246,503 B1
(45) Date of Patent: Jul. 24, 2007

(54) ENHANCED DRYING DEHUMIDIFIER

(75) Inventors: Timothy S. O'Brien, Deforest, WI (US); Steve S. Dingle, McFarland, WI (US)

(73) Assignee: Bou-Matic Technologies LLC, Madison, WI (US)

( * ) Notice: Subject to any disclaimer, the term of this patent is extended or adjusted under 35 U.S.C. 154(b) by 94 days.

(21) Appl. No.: 11/280,054

(22) Filed: Nov. 16, 2005

(51) Int. Cl.
*F25D 21/00* (2006.01)

(52) U.S. Cl. .......................... 62/272; 62/92

(58) Field of Classification Search ............. 62/92, 62/185, 272, 292
See application file for complete search history.

(56) References Cited

U.S. PATENT DOCUMENTS

| 4,607,498 A | * | 8/1986 | Dinh ........................ 62/185 |
| 5,031,411 A | | 7/1991 | Gehring et al. |
| 5,117,651 A | * | 6/1992 | Suh ........................... 62/288 |
| 5,443,624 A | | 8/1995 | Claesson |
| 5,634,353 A | | 6/1997 | Hallin et al. |
| 5,794,453 A | | 8/1998 | Barnwell |
| 5,901,565 A | * | 5/1999 | Morton, Jr. .............. 62/285 |

* cited by examiner

*Primary Examiner*—Melvin Jones
(74) *Attorney, Agent, or Firm*—Andrus, Sceales, Starke & Sawall, LLP

(57) ABSTRACT

A dehumidifier includes an impeller in a cabinet downstream of a condenser coil and drawing air through the cabinet from upstream to downstream through first, second and third segments of an air flow path from an evaporator coil to the condenser coil.

24 Claims, 12 Drawing Sheets

FIG. 2 PRIOR ART
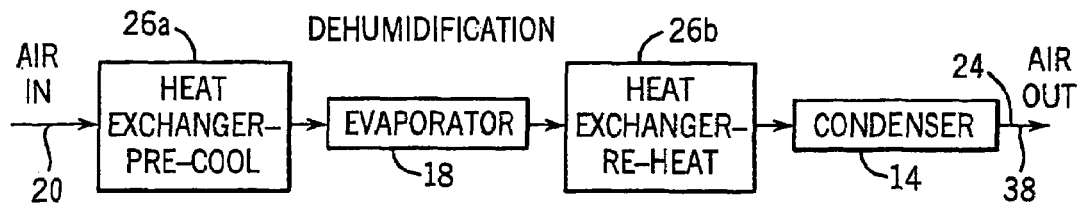
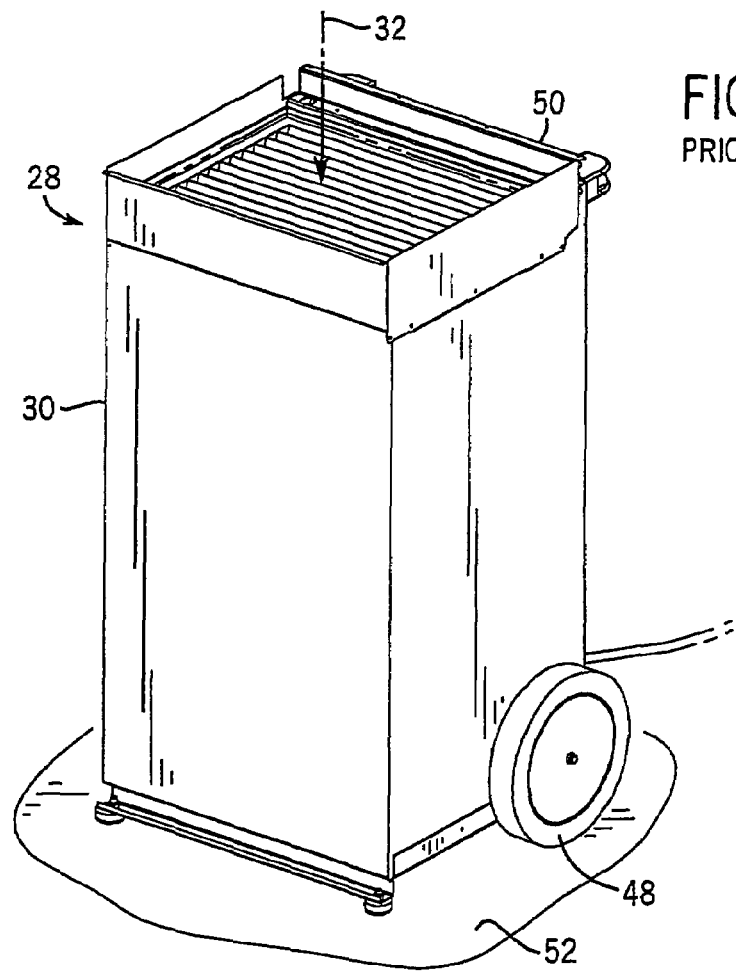
FIG. 3 PRIOR ART

ENHANCED DRYING DEHUMIDIFIER

BACKGROUND AND SUMMARY

The invention relates to dehumidifiers, and more particularly to improved performance and efficiency.

Dehumidifiers are known in the prior art. A compressor delivers hot compressed refrigerant gas. A condenser receives the refrigerant gas and condenses same to hot refrigerant liquid. An expansion device receives the refrigerant liquid from the condenser and expands same to drop the temperature and pressure of the liquid. An evaporator receives the cool liquid refrigerant from the expansion device and evaporates same to cold gas refrigerant, which is returned to the compressor to complete the refrigeration cycle. Air flow is directed across the evaporator to cool the air below the dew point such that water vapor in the air is condensed to liquid to dehumidify the air. The dehumidified air is then directed across the condenser to warm the air.

The present invention arose during continuing development efforts directed toward improved performance and efficiency in a dehumidifier.

BRIEF DESCRIPTION OF THE DRAWING

FIG. 2 is a schematic illustration of a dehumidification system known in the prior art.

FIG. 3 is a perspective view showing a dehumidifier, including portable cabinet, known in the prior art.

FIG. 19 is an exploded perspective view of the structure of FIG. 14.

DETAILED DESCRIPTION

Prior Art

Figure 1:
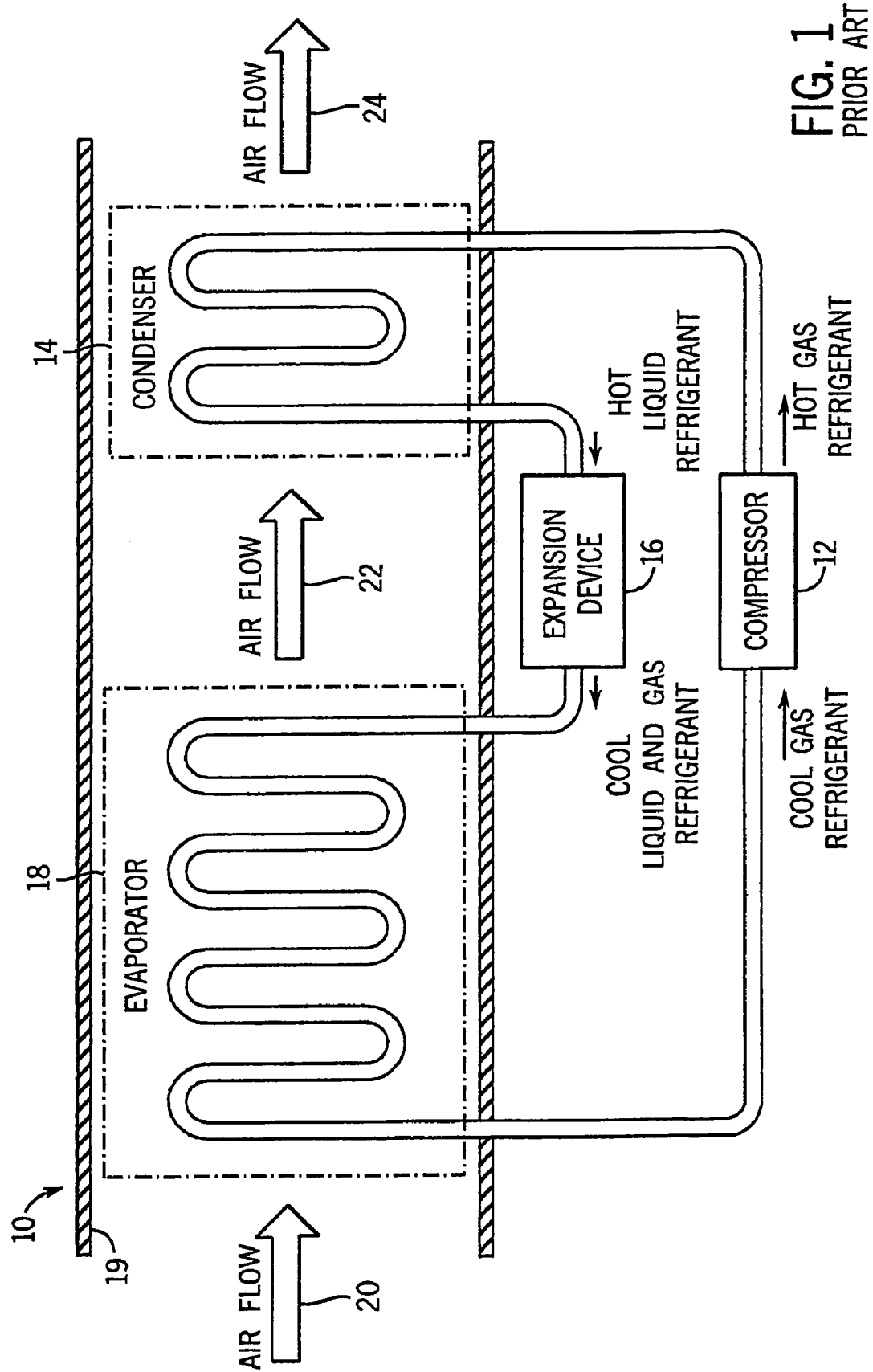
FIG. 1 shows a dehumidifier known in the prior art and is taken from FIG. 1 of U.S. Pat. No. 5,031,411, incorporated herein by reference.

FIG. 1 shows a dehumidifier 10 known in the prior art. A compressor 12 delivers compressed hot gas refrigerant. A condenser 14 receives the hot gas refrigerant and condenses same to hot liquid refrigerant, and gives up heat to the air flow therethrough. An expansion device 16 receives the hot liquid refrigerant and expands same to a liquid and gas refrigerant mixture of reduced temperature and pressure. Expansion device 16 is typically a flow restrictor, capillary tube, or other pressure reducer. An evaporator 18 receives the cool liquid and gas refrigerant mixture and evaporates the liquid portion to cool gas refrigerant, and absorbs heat from the air flow therethrough. The refrigerant is circulated from compressor 12 to condenser 14 to expansion device 16 to evaporator 18 and back to compressor 12 in a refrigeration cycle. Air flow, typically driven by a fan (not shown), is directed by a duct or housing 19 along a path through evaporator 18 and condenser 14. As the air flows through evaporator 18 from point 20 to point 22, the temperature of the air drops below the dew point such that water vapor in the air is condensed to liquid to dehumidify the air. The air is heated as it flows through condenser 14 from point 22 to point 24, and the warmed and dehumidified air is discharged to the desired space, such as a basement, or other interior space of a house or building.

Figure 4:
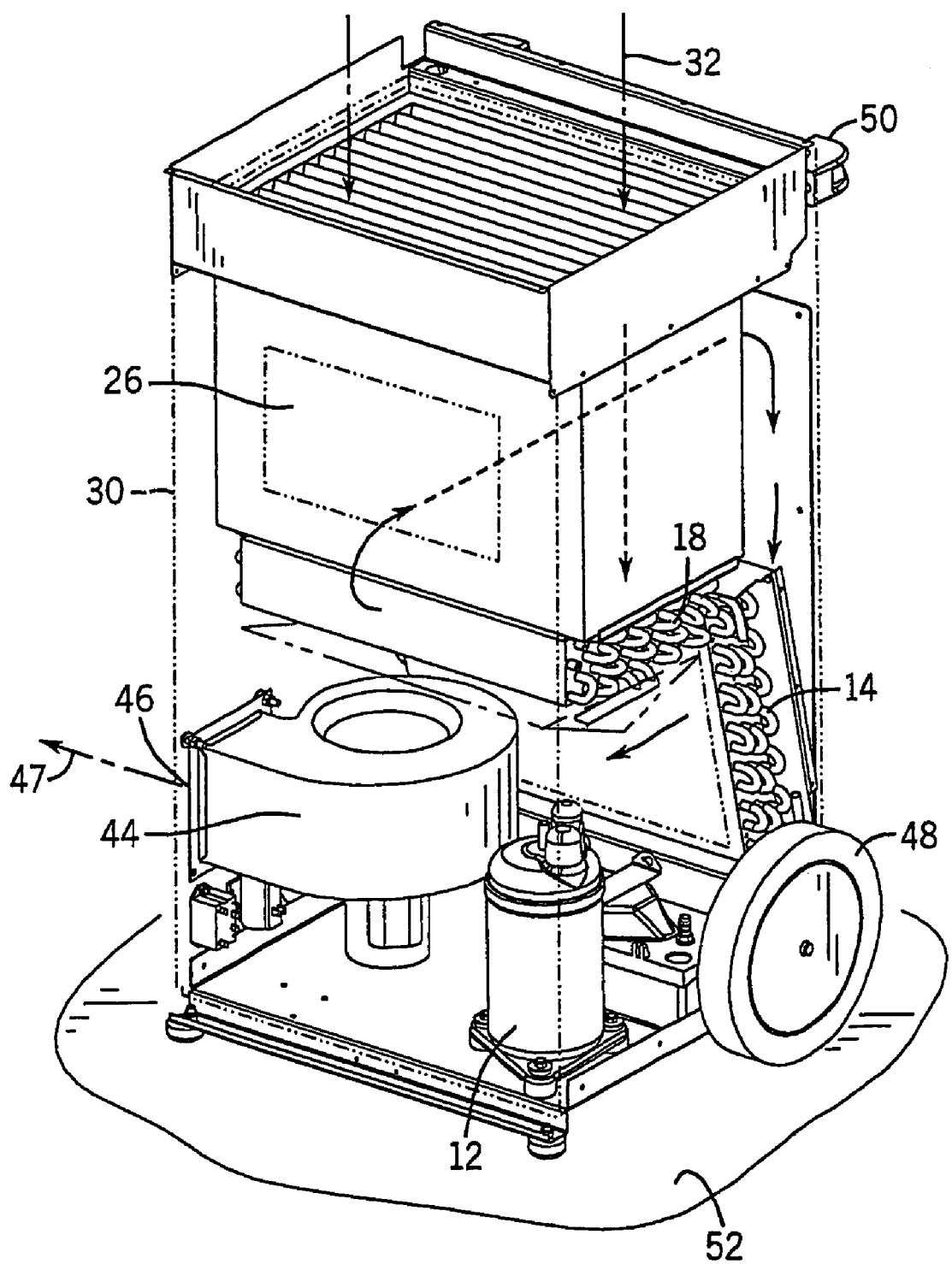
FIG. 4 shows the dehumidifier of FIG. 3 partially broken away, showing prior art.
Figure 5:
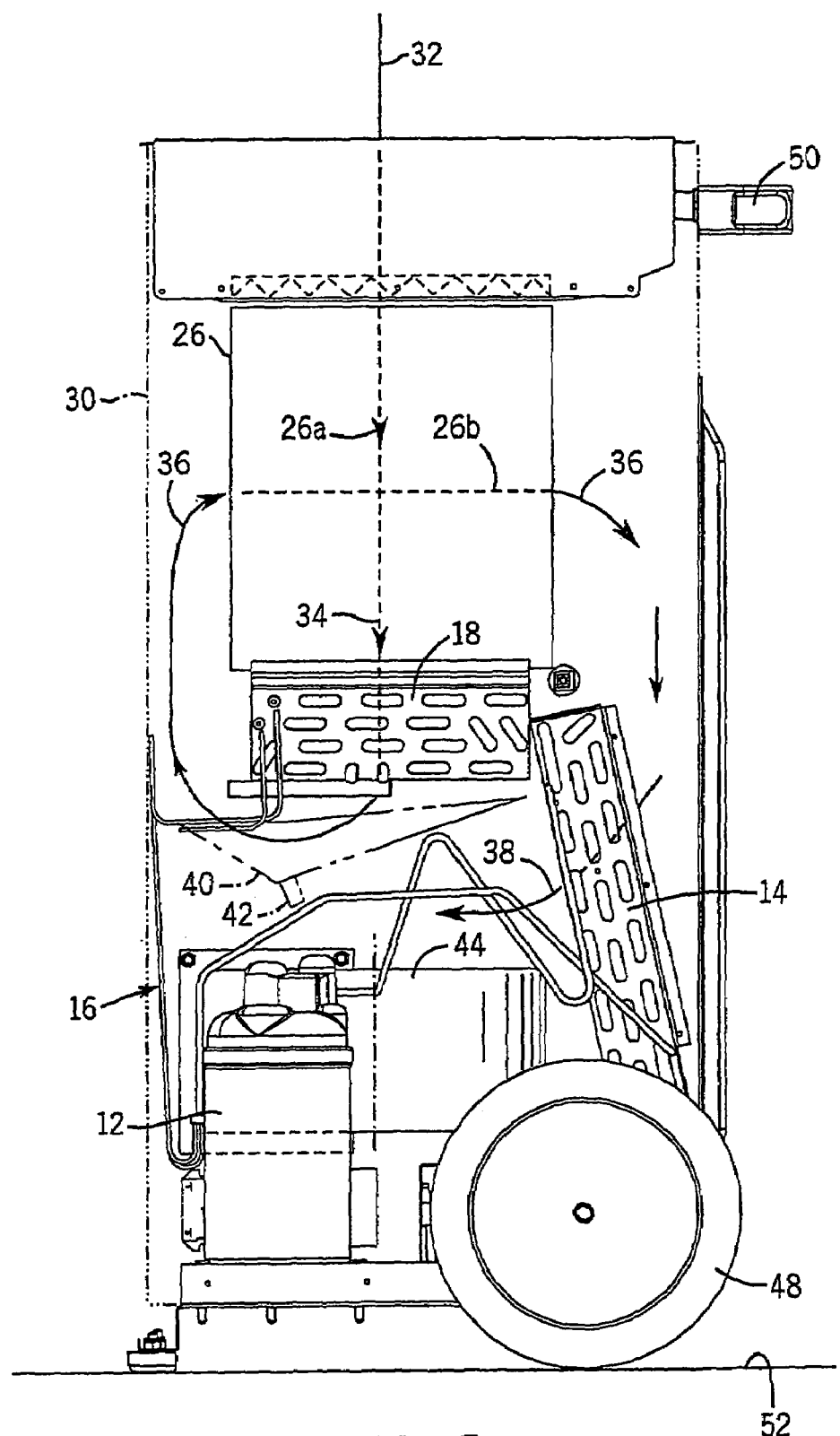
FIG. 5 is a side view of the dehumidifier of FIG. 4, showing prior art.
Figure 6:
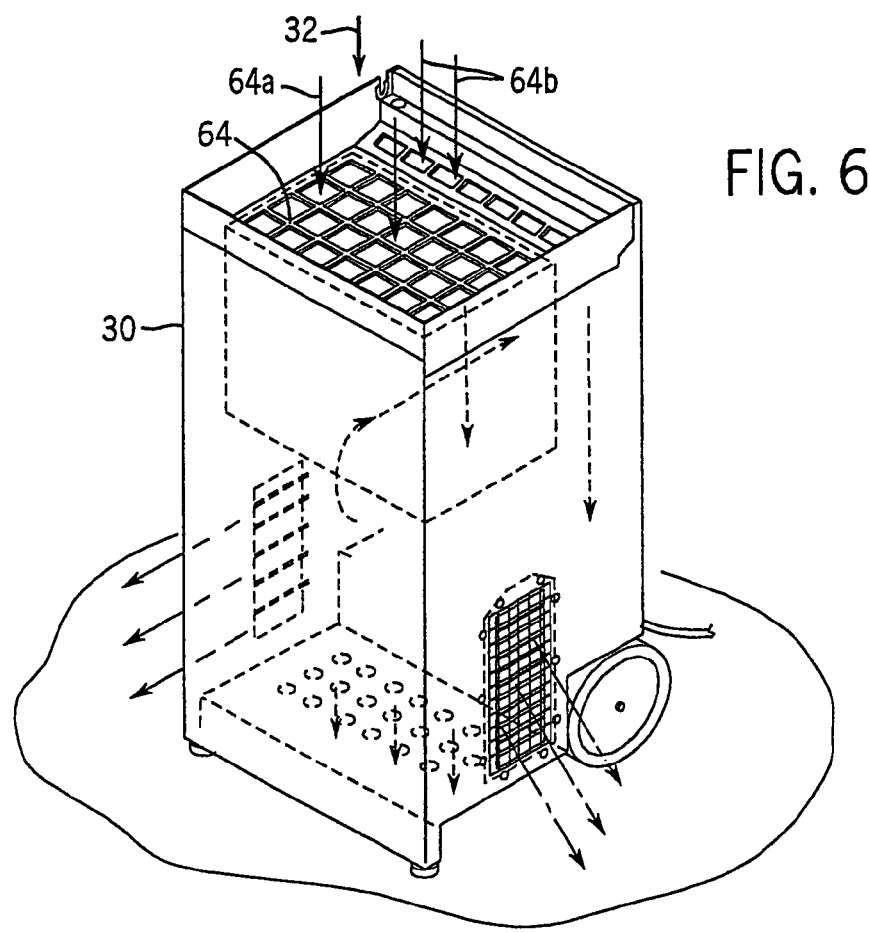
FIG. 6 is a perspective view of a dehumidifier, including portable cabinet, in accordance with the present invention.
Figure 7:
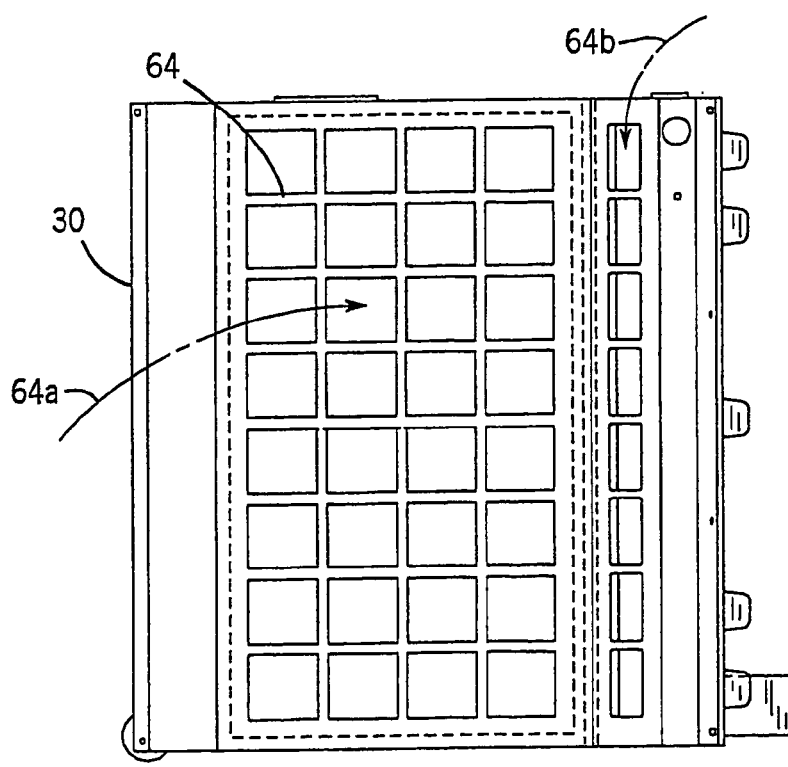
FIG. 7 is a top elevation view of the dehumidifier of FIG. 6.

FIG. 2 further schematically illustrates the dehumidification of system of FIG. 1 and uses like reference numerals where appropriate to facilitate understanding. It is known to provide a heat exchanger 26a, 26b for pre-cooling the air upstream of evaporator 18 and then re-heating the air downstream of the evaporator. FIGS. 3-5 show a dehumidifier 28 including a portable cabinet 30, compressor 12 in the cabinet for delivering hot compressed refrigerant, condenser coil 14 in the cabinet and receiving refrigerant from compressor 12 and condensing same, capillary tube expansion device 16 in the cabinet and receiving refrigerant from condenser coil 14 and expanding same, and evaporator coil 18 in the cabinet and receiving refrigerant from expansion device 16 and evaporating same, and delivering the refrigerant to compressor 12. The refrigerant is circulated from compressor 12 to condenser coil 14 to expansion device 16 to evaporator coil 18 and back to compressor 12 in a refrigeration cycle, as is known. Cabinet 30 has an air flow path 32 therethrough, including a first segment 34, FIG. 5, passing ambient air to evaporator coil 18, a second segment 36 passing air from evaporator coil 18 to condenser coil 14, and a third segment 38 discharging air from condenser coil 14. The first, second and third segments, 34, 36 and 38, are in series from upstream to downstream, respectively. Heat exchanger 26 has first and second heat exchange paths 26a and 26b therethrough in heat exchange relation, for example provided by a plurality of layered corrugated sheets providing vertical air flow channels therethrough at 26a in heat exchange relation with a plurality of interdigitated corrugated layered sheets providing horizontal flow channels therethrough at 26b, providing an air-to-air cross flow heat exchanger as is known. Heat exchanger path 26a provides pre-cooled ambient air from which moisture is removed by evaporator coil 18. The removed moisture is collected at collection pan 40 having drainage outlet 42. The air is re-heated at heat exchanger flow path 26b, and the warm dry air is supplied to condenser coil 14 as pulled therethrough by squirrel cage blower 44 which discharges the dehumidified air at outlet 46 as shown as arrow 47. Portable cabinet 30 may be mounted on wheels such as 48 and have a handle such as 50 for maneuvering the cabinet and rolling it along a floor such as 52.

Present Invention

FIGS. 6-19 illustrate the present invention and use like reference numerals from above where appropriate to facilitate understanding.

Figure 8:
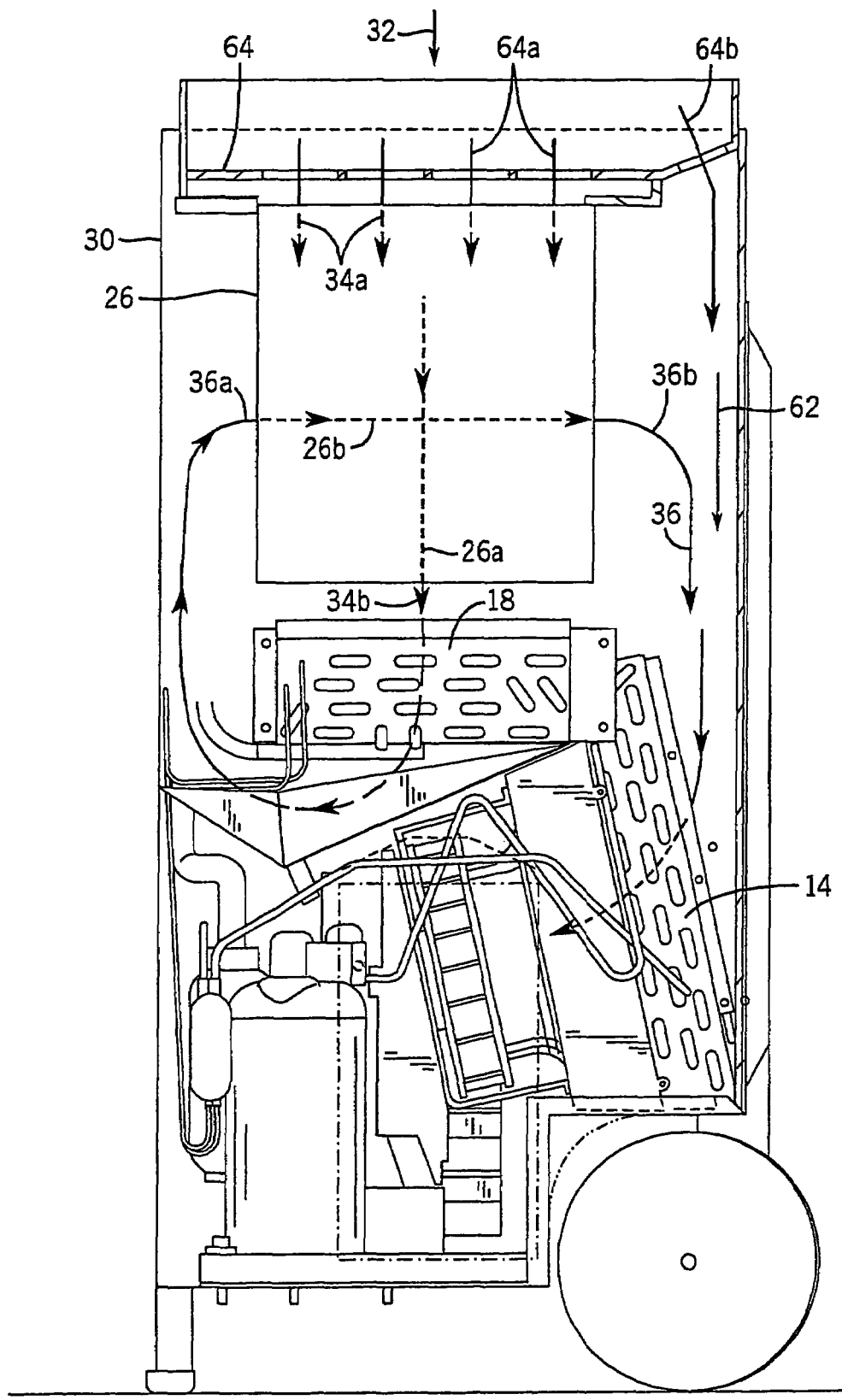
FIG. 8 is a side view, partially broken away, of the dehumidifier of FIG. 6.
Figure 9:
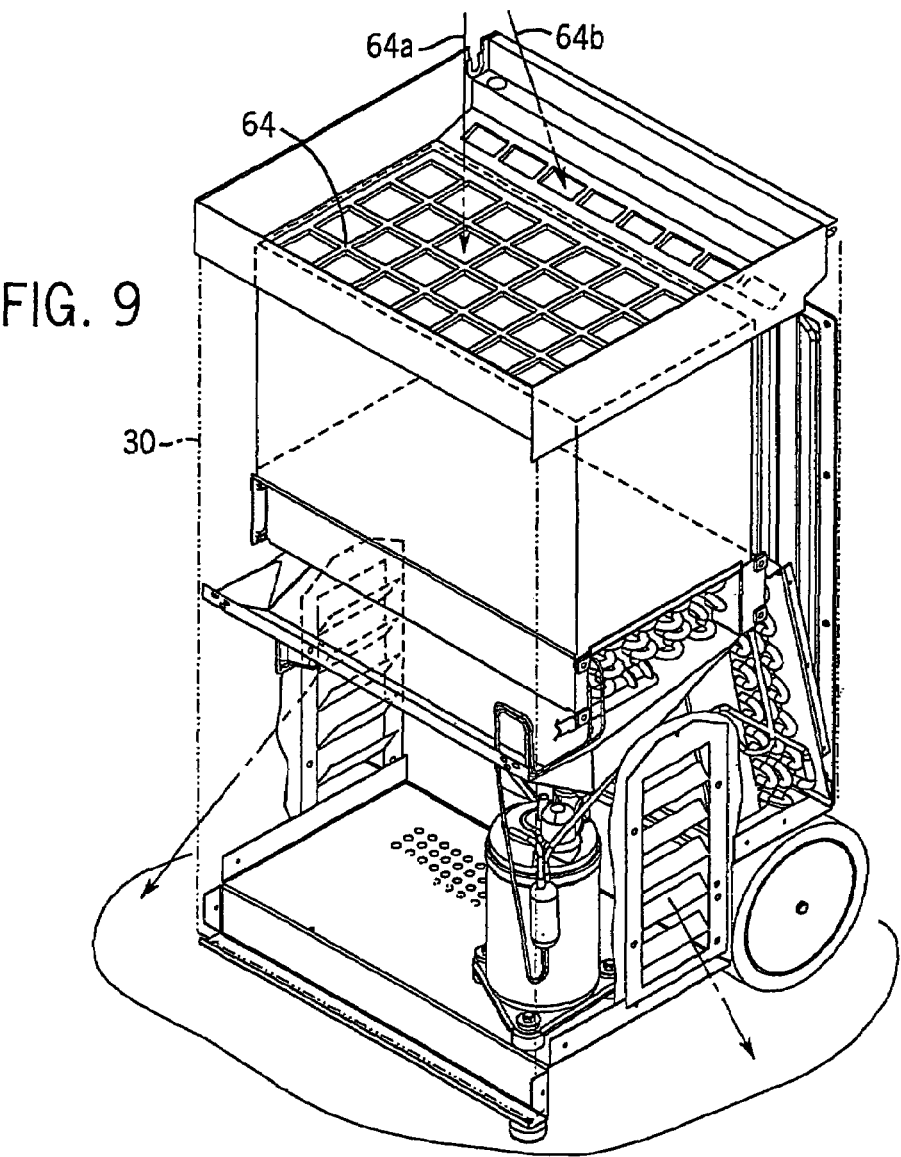
FIG. 9 is a perspective view, partially broken away, of the dehumidifier of FIG. 6.
Figure 10:
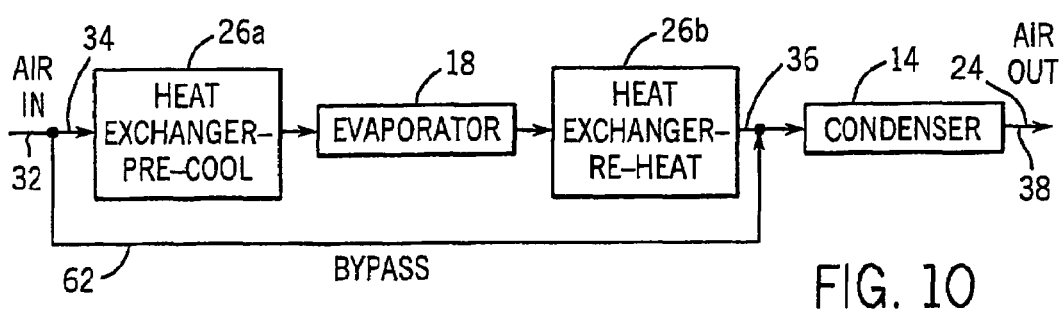
FIG. 10 is a schematic illustration of a dehumidifier in accordance with the invention.

In FIGS. 6-10, the air flow path has a fourth segment 62, FIG. 8, passing ambient air to condenser coil 14. Fourth segment 62 is in parallel with second segment 36 of the air flow path. First segment 34 of the air flow path has a first subsegment 34a supplying ambient air to first heat exchange path 26a of the heat exchanger, and has a second subsegment 34b supplying air from first heat exchange path 26a of the heat exchanger to evaporator coil 18. Second segment 36 of the air flow path has a third subsegment 36a supplying air from evaporator coil 18 to second heat exchange path 26b of the heat exchanger, and a fourth subsegment 36b supplying air from second heat exchange path 26b of the heat exchanger to condenser coil 14. Fourth segment 62 is in parallel with fourth subsegment 36b. Segment 62 of the air flow path merges with subsegment 36b of the air flow path downstream of second heat exchange path 26b of heat exchanger 26. Fourth segment 62 of the air flow path is in parallel with each of the noted first and fourth subsegments 34a and 36b of the air flow path. Cabinet 30 has an inlet at grate 64 receiving ambient air at 32 and having first and second branches 64a and 64b. First branch 64a provides the noted first segment 34 of the air flow path. Second branch 64b provides the noted fourth segment 62 of the air flow path. Fourth segment 62 of the air flow path bypasses evaporator coil 18, and preferably bypasses both heat exchanger 26 and evaporator coil 18. Fourth segment 62 of the air flow path merges with second segment 36 upstream of condenser coil 14. The arrangement enhances high temperature performance of the dehumidifier. More moisture is removed over a standard dehumidifier under high ambient temperature conditions. The present dehumidifier operation envelope is increased by bypassing a percentage of incoming ambient air around the evaporator and across the condenser. This extra air mixes with the air from the air-to-air cross flow heat exchanger 26 and lowers the condensing temperature. A lower condensing temperature extends the operation range using the same capacity compressor, evaporator and condenser coils.

Figure 11:
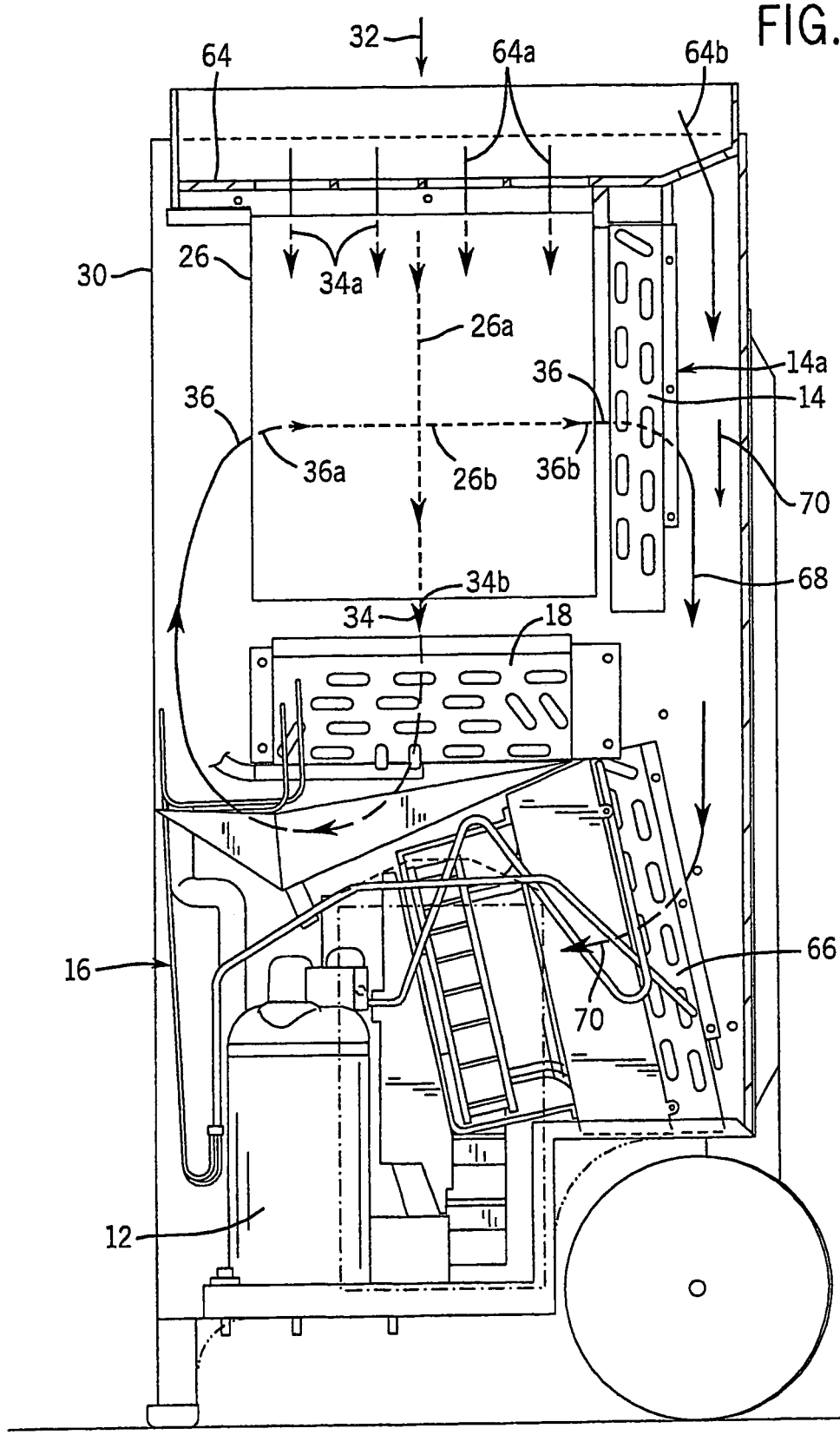
FIG. 11 is like FIG. 8 and shows a further embodiment.
Figure 12:
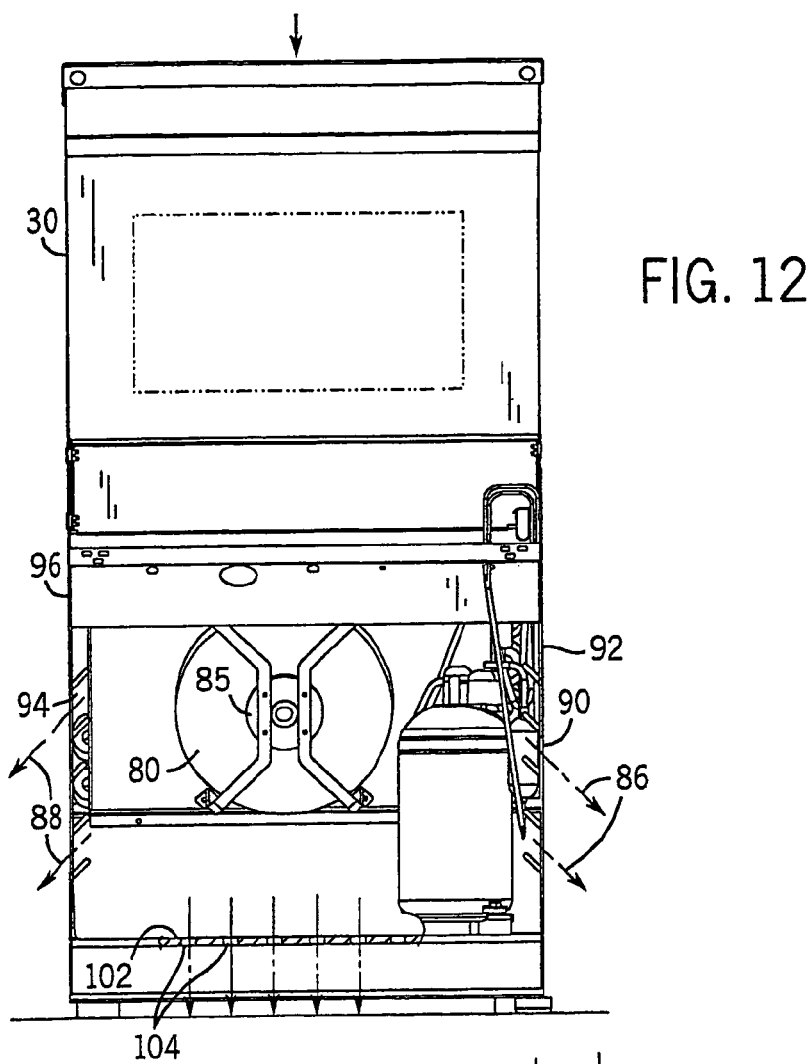
FIG. 12 is an end view, partially broken away, of the dehumidifier of FIG. 9.

In FIG. 11, a desuperheater coil 66 is provided in cabinet 30 and receives refrigerant from compressor 12 and condenses same, and condenser coil 14 is moved to location 14a and receives refrigerant from desuperheater coil 66 and condenses same and supplies the refrigerant to the expansion device as above. Refrigerant is circulated from compressor 12 to desuperheater coil 66 to condenser coil 14 at location 14a to expansion device 16 to evaporator coil 18 and back to compressor 12 in a refrigeration cycle. First segment 34 of the air flow path passes ambient air to evaporator coil 18. Second segment 36 passes air from evaporator coil 18 to condenser coil 14. A third segment 68 passes air from condenser coil 14 at location 14a to desuperheater coil 66. A fourth segment 70 discharges air from desuperheater coil 66. The air flow path has a fifth segment 70 passing ambient air to desuperheater coil 66. First, second, third and fourth segments 34, 36, 68 and 70 of the air flow path in FIG. 11 are in series from upstream to downstream, respectively, and fifth segment 70 is in parallel with third segment 68. Heat exchanger 26 has the noted first and second heat exchange paths 26a and 26b therethrough. First segment 34 of the air flow path has the noted first subsegment 34a supplying ambient air to first heat exchange path 26a of the heat exchanger, and second subsegment 34b supplying air from first heat exchange path 26a of the heat exchanger to evaporator coil 18. Second segment 36 of the air flow path has the noted third subsegment 36a supplying air from evaporator coil 18 to second heat exchange path 26b of the heat exchanger, and fourth subsegment 36b supplying air from second heat exchange path 26b of the heat exchanger to condenser coil 14 at location 14a. Fifth segment 70 of the air flow path is in parallel with the noted fourth subsegment 36b after the latter passes through the condenser coil. Fifth segment 70 of the air flow path merges with third segment 68 of the air flow path downstream of condenser coil 14 and upstream of desuperheater coil 66. Fifth segment 70 is in parallel with the noted first subsegment 34a.

Cabinet 30 in FIG. 11 has the noted inlet at grate 64 receiving ambient air at 32 and having the noted first and second branches 64a and 64b. First branch 64a provides first segment 34 of the air flow path. Second branch 64b provides the noted fifth segment 70 of the air flow path. Fifth segment 70 bypasses each of heat exchanger 26 and evaporator coil 18 and condenser coil 14. The arrangement removes more moisture than a standard dehumidifier under high ambient temperature conditions. The present dehumidifier operation envelope is increased by bypassing a percentage of incoming ambient air around the evaporator and across the desuperheater coil. This extra air mixes with the air from the condensing coil at location 14a and lowers the condensing temperature. The combination of desuperheater coil 66 and condenser coil 14 at location 14a captures the lower temperature air for condensing and the higher temperature mixed air for removing the superheat. This provides even greater efficiency than the arrangement of FIGS. 6-10. For example, the vapor temperature exiting the compressor 12 may typically be 140 to 150° F., but the condensing temperature may be about 120° F. This extra 30° F. of superheat is utilized by directing the bypass air at 70 across the desuperheater coil 66, which bypass air was not pre-cooled as is the air flow at 34. Separate coils may be used at 66 and 14a, or alternatively different sections of one coil may be used.

In FIGS. 12-19, squirrel cage blower 44 of FIG. 4 is replaced by an impeller 80 in cabinet 30 downstream of condenser coil 14 and drawing air through the cabinet from upstream to downstream, namely through the noted first, second and third segments 34, 36, 38 of the air flow path in FIGS. 6-10, respectively, and any further air flow path segments such as in FIG. 11. Impeller 80 is preferably a backward incline blade impeller, sometimes called a backward curved impeller, as readily commercially available, for example from Soler & Palau, Inc., 16 Chapin Road, Unit #903, P.O. Box 637, Pine Brook, N.J. 07058.

Figure 13:
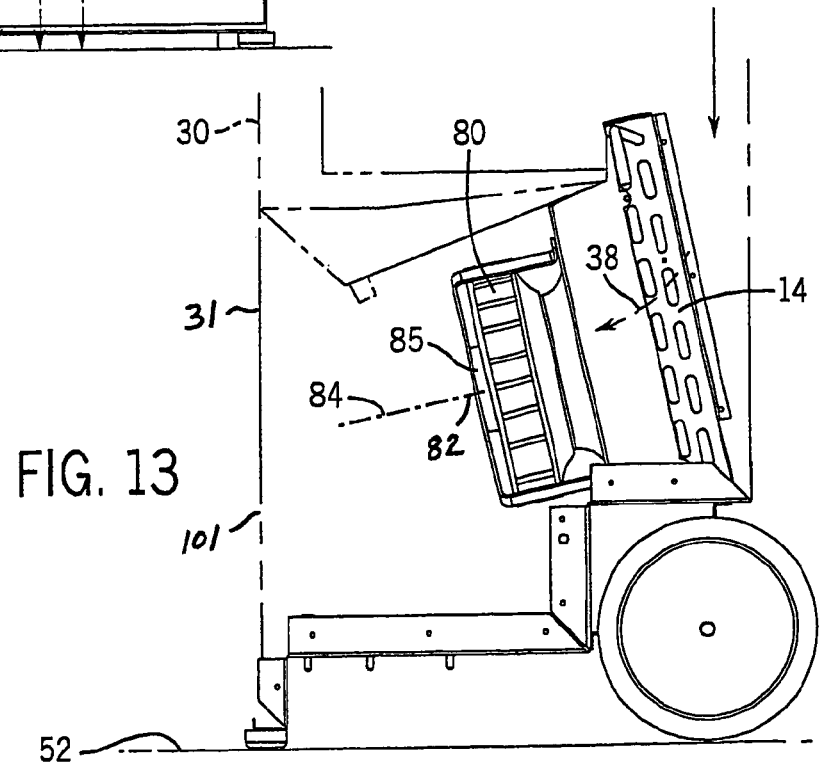
FIG. 13 is a side view, partially broken away, of a portion of the dehumidifier of FIG. 9.
Figure 14:
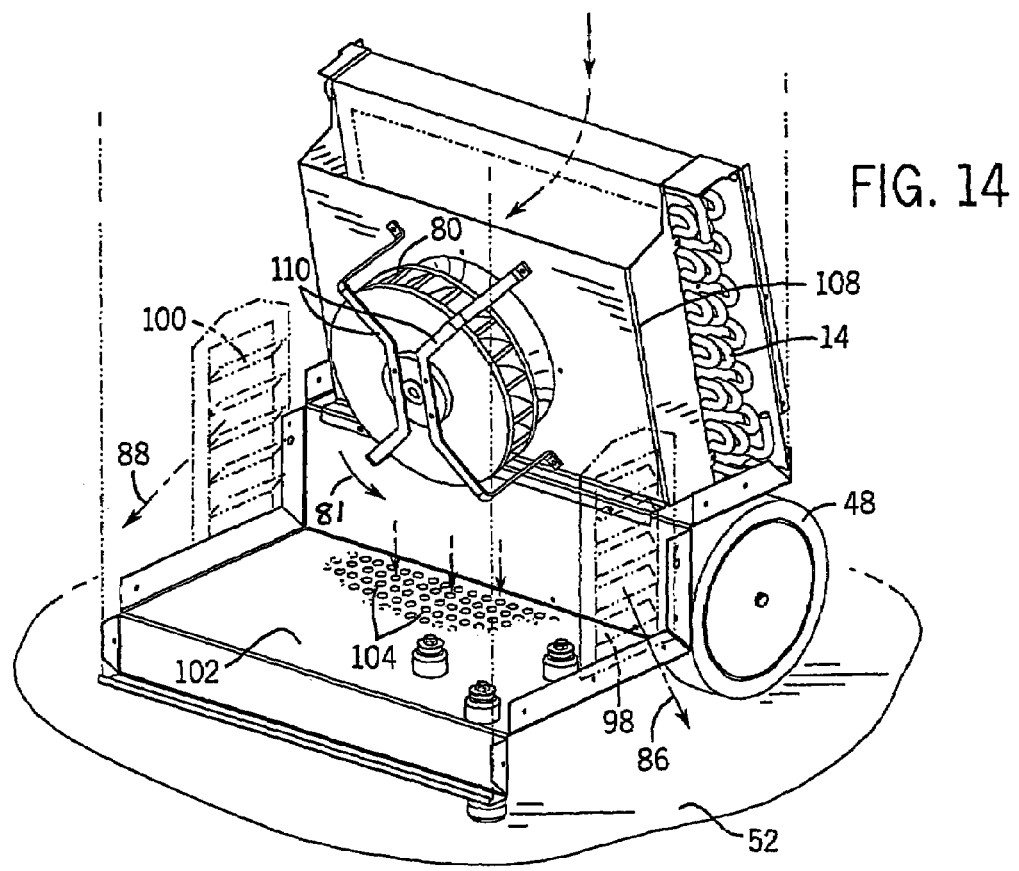
FIG. 14 is a perspective view of a portion of the structure of FIG. 9.
Figure 15:
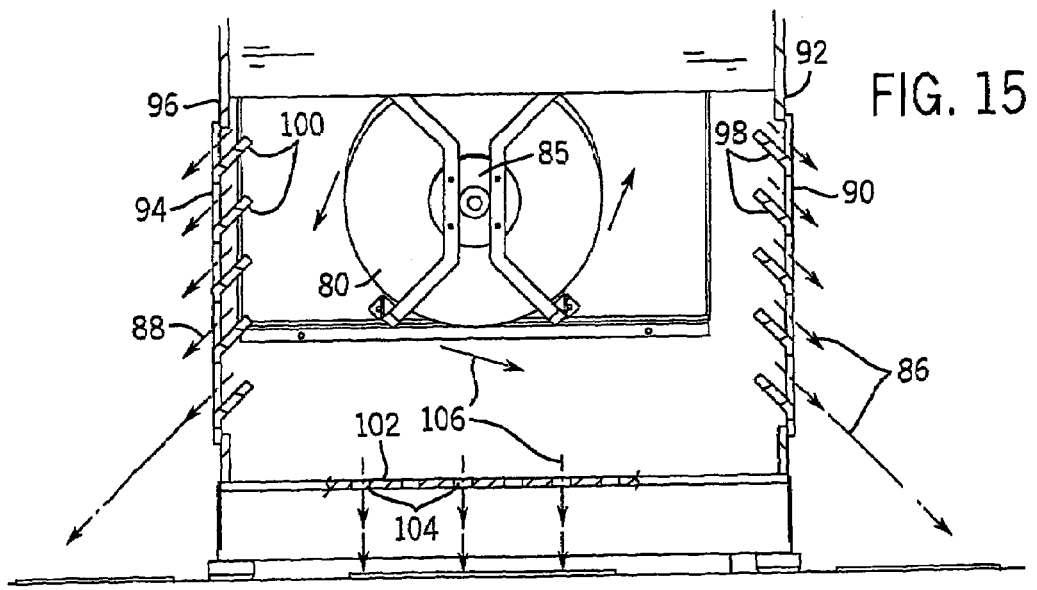
FIG. 15 is an end view of the structure of FIG. 14.
Figure 16:
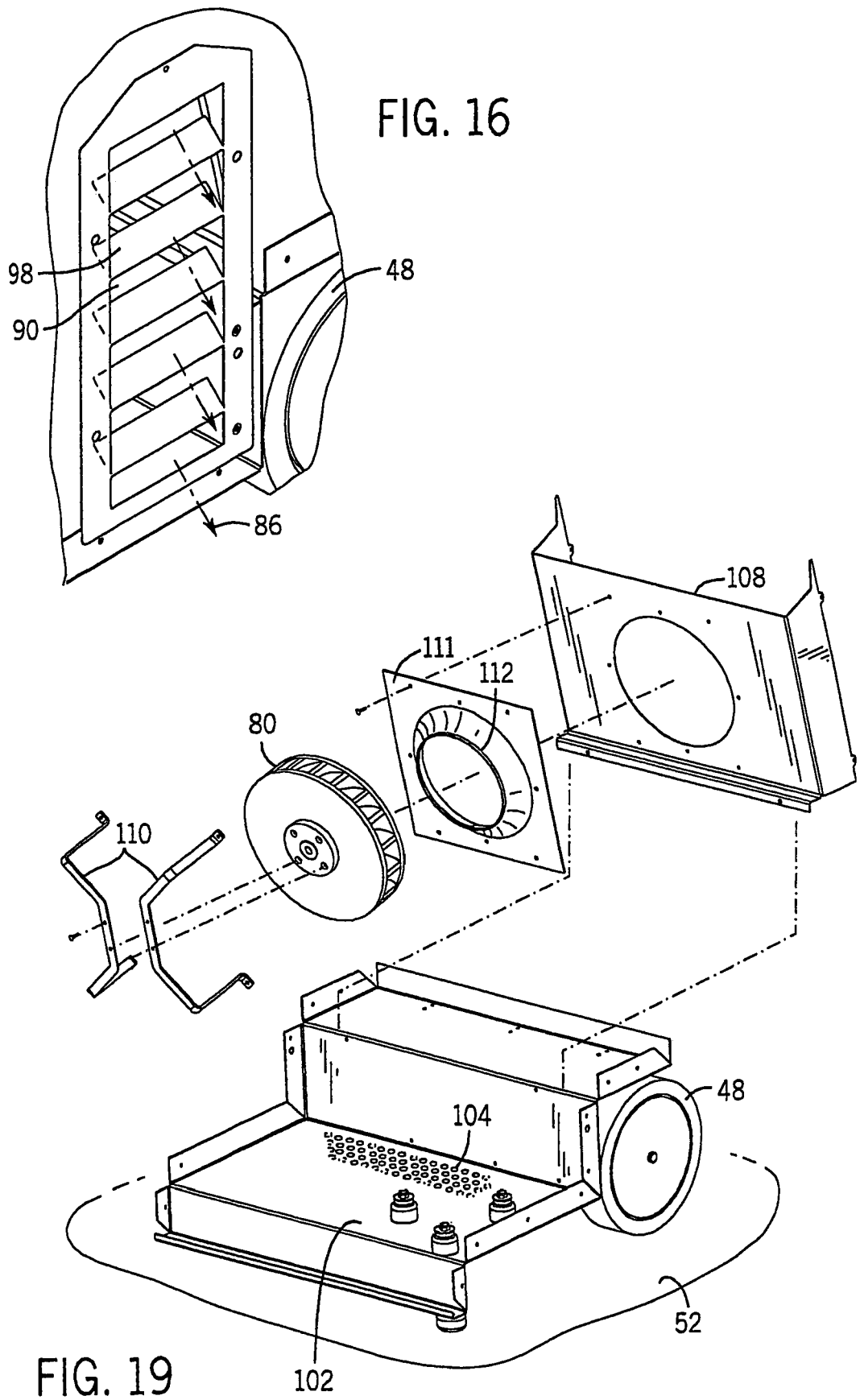
FIG. 16 is an enlarged perspective view of a portion of the structure of FIG. 9.
Figure 17:
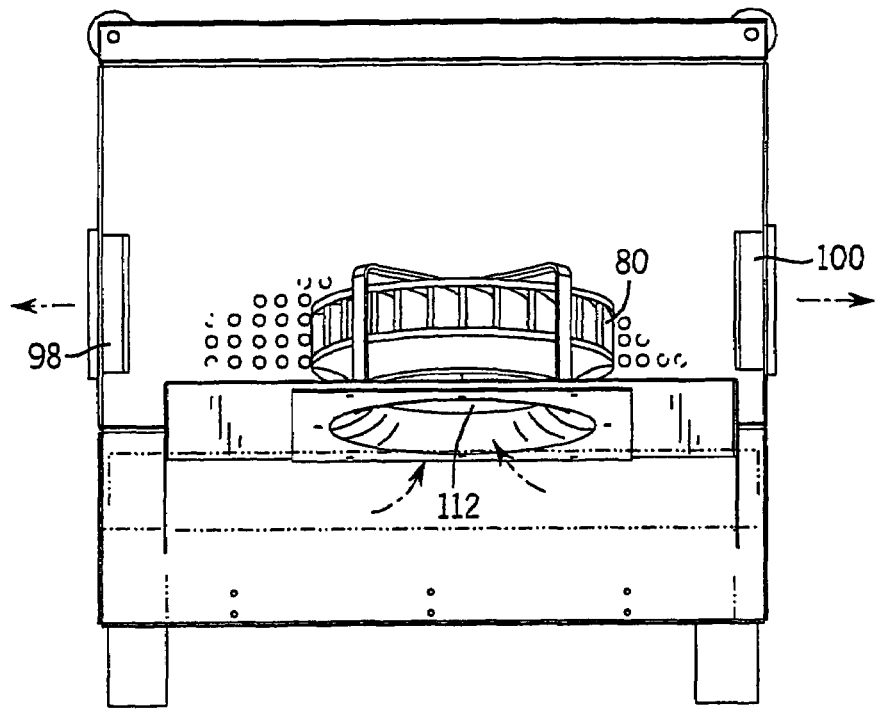
FIG. 17 is a top view of a portion of the structure of FIG. 14.
Figure 18:
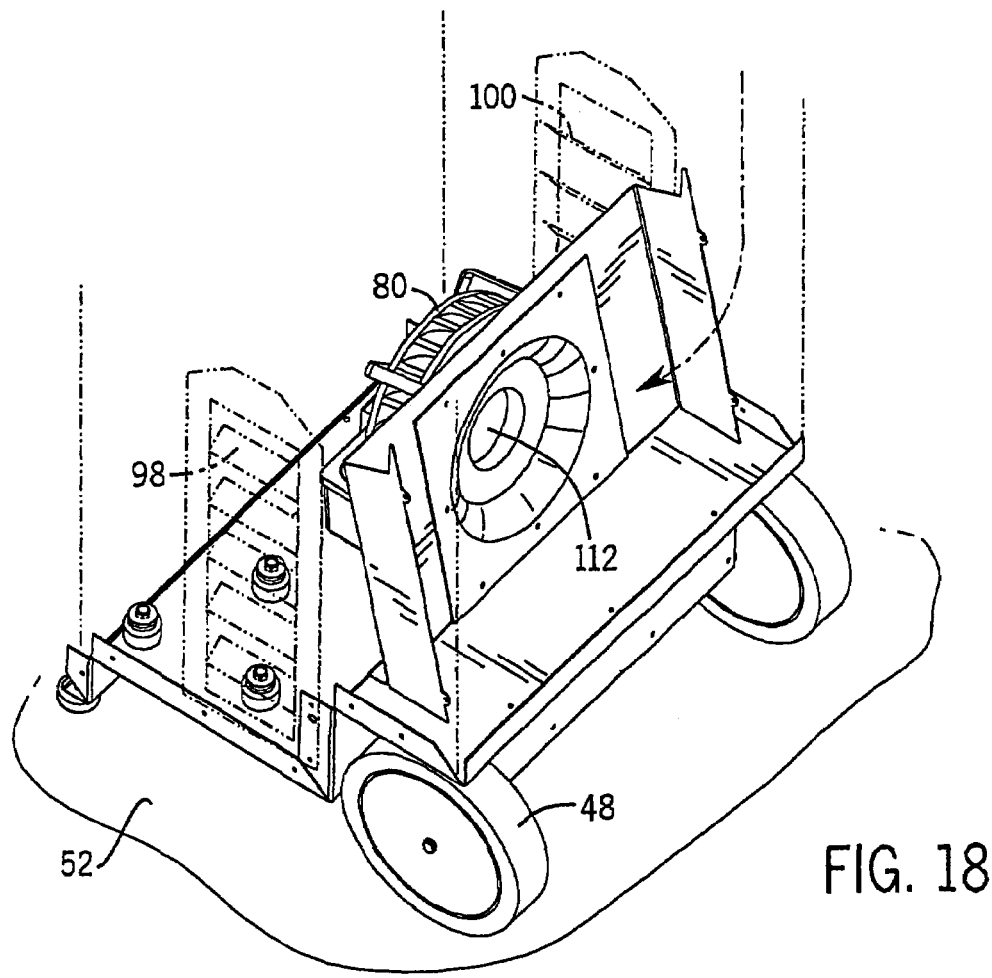
FIG. 18 is a perspective view of a portion of the structure of FIG. 14.

Impeller 80 rotates about a rotation axis 82, FIG. 13, extending along an axial direction 84 and driven by a motor 85, as is known. As viewed in FIG. 14, impeller 80 rotates counterclockwise, as shown at rotational directional arrow 81. Third segment 38 of the air flow path extends axially along axial direction 84. The air flow path has a further segment 86, and preferably distally opposite segments 86 and 88, FIGS. 14, 15, discharging air from the impeller. Segments 86, 88 extend radially along respective radial directions relative to axial direction 84. Cabinet 30 has an air flow outlet provided by one or more openings 90 in a cabinet sidewall 92 distally oppositely spaced from impeller 80 along the noted radial direction, and has a second air flow outlet provided by one or more openings 94 in cabinet sidewall 96 distally oppositely spaced in the other direction from impeller 80 along the noted radial direction. Cabinet 30 is portable, as above noted, including along a floor such as 52. One or more deflectors 98, FIG. 15, direct exiting air downwardly through openings 90 in cabinet sidewall 92 towards floor 52 exteriorly of cabinet 30 to dry floor 52, such that the dehumidifier is also a water-damage-restoration drying fan. A second set of one or more deflectors 100 direct exiting air downwardly through openings 94 in cabinet sidewall 96 towards floor 52 exteriorly of cabinet 30 to dry floor 52. The respective cabinet sidewall has one or more louvers extending thereacross and angled downwardly to provide the noted sets of deflectors 98, 100. In further embodiments, one or more openings 101 may be provided in cabinet front wall 31 along axial direction 84, providing an air flow outlet therethrough.

Cabinet 30 has a bottom wall 102 with one or more openings 104 therein. The air flow path has a segment 106 passing air from impeller 80 through the one or more openings 104 in bottom wall 102. The dehumidifier thus has plural air flow outlets, including the air flow outlet along segment 86 through opening 90 in cabinet sidewall 92, the air flow outlet along segment 88 through opening 94 in cabinet sidewall 96, and the air flow outlet along segment 106 through opening 104 in bottom wall 102 of the cabinet. The cabinet includes a plenum wall 108 between condenser coil 14 and impeller 80 and mounting the latter thereto at a pair of brackets 110 and having a shroud 111 with an opening 112 therethrough for communicating air from coil 14 to impeller 80 which in turn creates a negative pressure chamber drawing air from upstream to downstream as above noted, through coil 14 and opening 112 for discharge at flow path segments 86, 88, 106. The arrangement provides improved water restoration dehumidification particularly along floor 52 including underneath the dehumidifier cabinet 30, eliminating moisture shadows underneath the unit and in turn alleviating the need for service personnel to return periodically, e.g. the following day, to relocate the unit to otherwise dry the noted shadow. The backward incline blade impeller improves space efficiency for mounting, air volume, and the amount of air flow per current draw over a centrifugal blower such as a squirrel cage blower at the same air flow conditions. The louvered exits direct the warm dry air downwardly toward the high moisture floor instead of merely allowing dissipation of exiting dry air to the surroundings. This directed air flow enables the dehumidifier to function as a fan (e.g. for water damage restoration) in addition to being a dehumidification device. Solution of the noted moisture shadow problem is optional, through desirable and readily achievable by directing hot warm air underneath the unit as noted.

It is recognized that various equivalents, alternatives and modifications are possible within the scope of the appended claims.

What is claimed is:

1. A dehumidifier comprising:
a cabinet;
a compressor in said cabinet for delivering hot compressed refrigerant;
a condenser coil in said cabinet and receiving refrigerant from said compressor and condensing same;
an expansion device in said cabinet and receiving refrigerant from said condenser coil and expanding same;
an evaporator coil in said cabinet and receiving refrigerant from said expansion device and evaporating same, and delivering said refrigerant to said compressor;
said refrigerant being circulated from said compressor to said condenser coil to said expansion device to said evaporator coil and back to said compressor in a refrigeration cycle;
said cabinet having an air flow path therethrough comprising:
a first segment passing ambient air to said evaporator coil;
a second segment passing air from said evaporator coil to said condenser coil;
a third segment discharging air from said condenser coil;
said first, second and third segments of said air flow path being in series from upstream to downstream, respectively;
an impeller in said cabinet downstream of said condenser coil and drawing air through said cabinet from upstream to downstream, namely through said first, second and third segments of said air flow path, respectively.

2. The dehumidifier according to claim 1 wherein said impeller is a backward incline blade impeller.

3. The dehumidifier according to claim 1 wherein:
said impeller rotates about a rotation axis extending along an axial direction;
said third segment of said air flow path extends axially along said axial direction;
said air flow path has a fourth segment discharging air from said impeller, said fourth segment extending radially along a radial direction relative to said axial direction;
said cabinet has an air flow outlet provided by an opening in a cabinet sidewall distally oppositely spaced from said impeller along said radial direction.

4. The dehumidifier according to claim 3 wherein said cabinet is portable, including along a floor, and comprising one or more deflectors directing exiting air downwardly through said opening in said cabinet sidewall towards said floor exteriorly of said cabinet to dry said floor, such that said dehumidifier is also a water-damage-restoration drying fan.

5. The dehumidifier according to claim 4 wherein said opening in said cabinet sidewall has one or more louvers extending there across and angled downwardly to provide said one or more deflectors.

6. The dehumidifier according to claim 3 wherein:
said cabinet has a bottom wall with an opening therein;
said air flow path has a fifth segment passing air from said impeller through said opening in said bottom wall;
such that said dehumidifier comprises two air flow outlets, namely a first air flow outlet along said fourth segment of said air flow path through said opening in said sidewall of said cabinet, and a second air flow outlet along said fifth segment of said air flow path through said opening in said bottom wall of said cabinet.

7. The dehumidifier according to claim 6 wherein said cabinet is portable, including along a floor, and comprising one or more deflectors directing exiting air downwardly through said opening in said sidewall of said cabinet towards said floor to dry same, such that said dehumidifier is also a water-damage-restoration drying fan drying the floor area around said cabinet through said first air flow outlet along said fourth segment of said air flow path through said opening in said sidewall of said cabinet, and also drying the floor area beneath said cabinet through said second air flow outlet along said fifth segment of said air flow path through said opening in said bottom wall of said cabinet.

8. The dehumidifier according to claim 1 wherein said air flow path comprises a fourth segment passing ambient air to said condenser coil.

9. The dehumidifier according to claim 8 wherein said first, second and third segments of said air flow path are in series from upstream to downstream, respectively, and said fourth segment of said air flow path is in parallel with said second segment of said air flow path.

10. The dehumidifier according to claim 9 comprising a heat exchanger having first and second heat exchange paths therethrough in heat exchange relation, and wherein:

said first segment of said air flow path has first and second subsegments;

said first subsegment supplies ambient air to said first heat exchange path of said heat exchanger;

said second subsegment supplies air from said first heat exchange path of said heat exchanger to said evaporator coil;

said second segment of said air flow path has third and fourth subsegments;

said third subsegment supplies air from said evaporator coil to said second heat exchange path of said heat exchanger;

said fourth subsegment supplies air from said second heat exchange path of said heat exchanger to said condenser coil;

said fourth segment is in parallel with said fourth subsegment.

11. The dehumidifier according to claim 10 wherein said fourth segment of said air flow path merges with said fourth subsegment of said air flow path downstream of said second heat exchange path of said heat exchanger.

12. The dehumidifier according to claim 10 wherein said fourth segment of said air flow path is in parallel with each of said first and fourth subsegments of said air flow path.

13. The dehumidifier according to claim 9 wherein said cabinet has an inlet receiving ambient air and having first and second branches, said first branch providing said first segment of said air flow path, said second branch providing said fourth segment of said air flow path.

14. The dehumidifier according to claim 8 wherein said fourth segment of said air flow path bypasses said evaporator coil.

15. The dehumidifier according to claim 10 wherein said fourth segment of said air flow path bypasses both said heat exchanger and said evaporator coil.

16. A dehumidifier comprising:
a cabinet;
a compressor in said cabinet for delivering hot compressed refrigerant;
a desuperheater coil in said cabinet and receiving refrigerant from said compressor and condensing same;
a condenser coil in said cabinet and receiving refrigerant from said desuperheater coil and condensing same;
an expansion device in said cabinet and receiving refrigerant from said condenser coil and expanding same;
an evaporator coil in said cabinet and receiving refrigerant from said expansion device and evaporating same, and delivering said refrigerant to said compressor;
said refrigerant being circulated from said compressor to said desuperheater coil to said condenser coil to said expansion device to said evaporator coil and back to said compressor in a refrigeration cycle;
said cabinet having an airflow path therethrough comprising;
a first segment passing ambient air to said evaporator coil;
a second segment passing air from said evaporator coil to said condenser coil;
a third segment passing air from said condenser coil to said desuperheater coil;
a fourth segment discharging air from said desuperheater coil;
said first, second, third and fourth segments of said air flow path being in series from upstream to downstream, respectively;
an impeller in said cabinet downstream of said desuperheater coil and drawing air through said cabinet from upstream to downstream, namely through said first, second, third and fourth segments of said air flow path, respectively.

17. The dehumidifier according to claim 16 wherein said air flow path comprises a fifth segment passing ambient air to said desuperheater coil.

18. The dehumidifier according to claim 17 wherein said first, second, third and fourth segments of said airflow path are in series from upstream to downstream, respectively, and said fifth segment of said air flow path is in parallel with said third segment of said air flow path.

19. The dehumidifier according to claim 18 comprising a heat exchanger having first and second heat exchange paths therethrough in heat exchange relation, and wherein:
said first segment of said airflow path has first and second subsegments;
said first subsegment supplies ambient air to said first heat exchange path of said heat exchanger;
said second subsegment supplies air from said first heat exchange path of said heat exchanger to said evaporator coil;
said second segment of said airflow path has third and fourth subsegments;
said third subsegment supplies air from said evaporator coil to said second heat exchange path of said heat exchanger;
said fourth subsegment supplies air from said second heat exchange path of said heat exchanger to said condenser coil;
said fifth segment is in parallel with said fourth subsegment after the latter passes through said condenser coil.

20. The dehumidifier according to claim 19 wherein said fifth segment of said airflow path is in parallel with said first subsegment of said airflow path.

21. The dehumidifier according to claim 18 wherein said fifth segment of said airflow path merges with said third segment of said airflow path downstream of said condenser coil and upstream of said desuperheater coil.

22. The dehumidifier according to claim 18 wherein said cabinet has an inlet receiving ambient air and having first and second branches, said first branch providing said first segment of said airflow path, said second branch providing said fifth segment of said airflow path.

23. The dehumidifier according to claim 17 wherein said fifth segment of said airflow path bypasses both said evaporator coil and said condenser coil.

24. The dehumidifier according to claim 19 wherein said fifth segment of said airflow path bypasses each of said heat exchanger and said evaporator coil and said condenser coil.

* * * * *

(12) INTER PARTES REEXAMINATION CERTIFICATE (966th)
United States Patent
O'Brien et al.

(10) Number: US 7,246,503 C1
(45) Certificate Issued: Oct. 1, 2014

(54) ENHANCED DRYING DEHUMIDIFIER

(75) Inventors: Timothy S. O'Brien, Deforest, WI (US); Steve S. Dingle, McFarland, WI (US)

(73) Assignee: Technologies Holdings Corp., Houston, TX (US)

Reexamination Request:
No. 95/001,362, May 27, 2010

Reexamination Certificate for:
Patent No.: 7,246,503
Issued: Jul. 24, 2007
Appl. No.: 11/280,054
Filed: Nov. 16, 2005

(51) Int. Cl.
*F25D 21/00* (2006.01)

(52) U.S. Cl.
USPC .................................. 62/272; 62/92

(58) Field of Classification Search
None
See application file for complete search history.

(56) References Cited

To view the complete listing of prior art documents cited during the proceeding for Reexamination Control Number 95/001,362, please refer to the USPTO's public Patent Application Information Retrieval (PAIR) system under the Display References tab.

*Primary Examiner* — William Doerrler

(57) ABSTRACT

A dehumidifier includes an impeller in a cabinet downstream of a condenser coil and drawing air through the cabinet from upstream to downstream through first, second and third segments of an air flow path from an evaporator coil to the condenser coil.

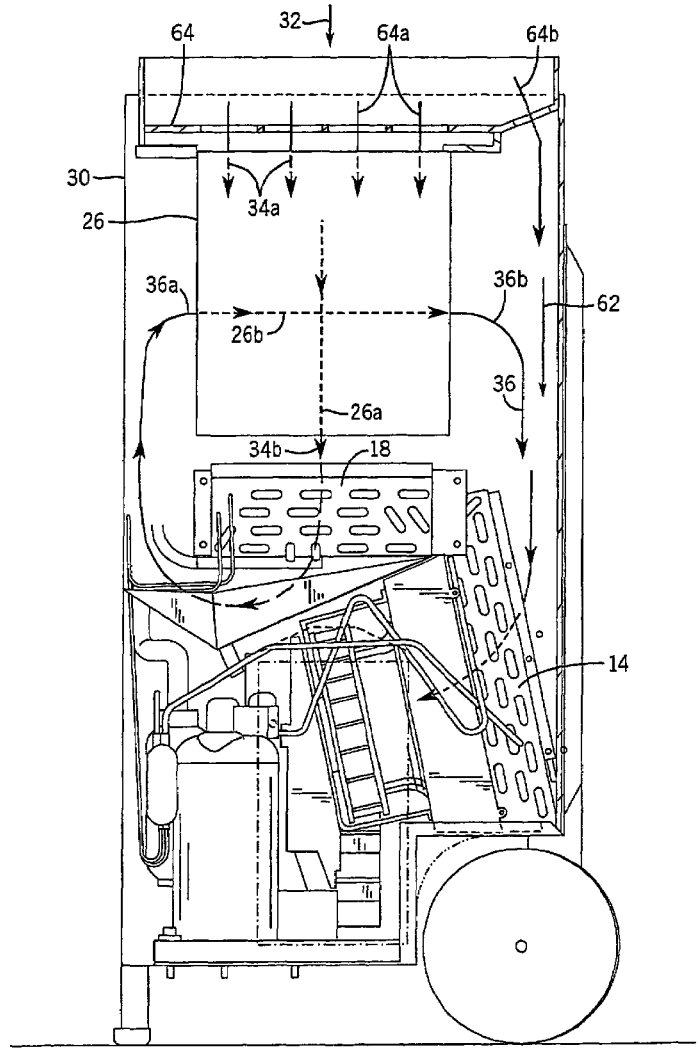

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-3 and 8-15 are cancelled.

Claims 4-7 and 16-24 were not reexamined.

\* \* \* \* \*